(12) United States Patent
Raipati

(10) Patent No.: US 11,182,817 B1
(45) Date of Patent: Nov. 23, 2021

(54) SYSTEM AND METHOD FOR CACHING OF DATA IN A COMPUTER SYSTEM

(71) Applicant: BBY Solutions, Inc., Richfield, MN (US)

(72) Inventor: Rambabu Raipati, Lakeville, MN (US)

(73) Assignee: BBY Solutions, Inc., Richfield, MN (US)

(*) Notice: Subject to any disclaimer, the term of this patent is extended or adjusted under 35 U.S.C. 154(b) by 179 days.

(21) Appl. No.: 16/693,641

(22) Filed: Nov. 25, 2019

Related U.S. Application Data

(63) Continuation of application No. 15/808,948, filed on Nov. 10, 2017, now Pat. No. 10,504,131.

(60) Provisional application No. 62/516,332, filed on Jun. 7, 2017.

(51) Int. Cl.
   *G06Q 30/02* (2012.01)
   *G06F 12/123* (2016.01)
   *G06Q 30/06* (2012.01)

(52) U.S. Cl.
   CPC ....... *G06Q 30/0222* (2013.01); *G06F 12/123* (2013.01); *G06Q 30/0635* (2013.01); *G06F 2212/1041* (2013.01)

(58) Field of Classification Search
   USPC .................................................... 705/14.23
   See application file for complete search history.

(56) References Cited

U.S. PATENT DOCUMENTS

| | | | |
|---|---|---|---|
| 6,886,000 B1 | 4/2005 | Aggarwal | |
| 7,647,252 B2 | 1/2010 | Rampell | |
| 8,630,923 B2 | 1/2014 | Rothman | |
| 8,732,018 B2 | 5/2014 | Mesaros | |
| 9,031,995 B1 | 5/2015 | Raden, II | |
| 9,443,253 B2 | 9/2016 | Carlson | |
| 2001/0014868 A1 | 8/2001 | Herz | |

(Continued)

FOREIGN PATENT DOCUMENTS

| | | |
|---|---|---|
| WO | WO2016000045 | 1/2016 |
| WO | WO2017015212 | 1/2017 |

OTHER PUBLICATIONS

Anonymous; Method and System for Providing a Real-time Discounted Price based Characteristics of a Customer and Items, IP.com, pp. 2-4 (Year: 2013).*

(Continued)

*Primary Examiner* — Rashida R Shorter
(74) *Attorney, Agent, or Firm* — Forgren Fisher; Daniel A. Tysver; James M. Urzedowski

(57) ABSTRACT

A system and method are presented for using a plurality of data caches to increase the efficiency of a computing system in an e-commerce environment. Separate caches with distinct time-to-live values are created, one each for customer information, customer cart contents, and product pricing data. Product pricing is pre-analyzed using a pricing data engine that calculates multiple potential prices for a single item that is then stored in the product pricing data cache. This data can then be used in a variety of contexts to determine different pricing for the same product without requiring another request for product data from the pricing data engine. When a product is viewed during catalog browsing, all information needed to determine pricing for that particular user might be accessible from the data caches for fast processing.

18 Claims, 6 Drawing Sheets

(56) References Cited

U.S. PATENT DOCUMENTS

| | | | |
|---|---|---|---|
| 2002/0062245 A1 | 5/2002 | Niu | |
| 2007/0016437 A1* | 1/2007 | Elmufdi | G06Q 30/02 |
| | | | 705/400 |
| 2008/0021771 A1 | 1/2008 | Wu | |
| 2008/0033831 A1* | 2/2008 | Boss | G06Q 30/0625 |
| | | | 705/26.62 |
| 2008/0235147 A1 | 9/2008 | Jensen | |
| 2009/0222337 A1 | 9/2009 | Sergiades | |
| 2011/0295670 A1 | 12/2011 | Thomas | |
| 2012/0116897 A1 | 5/2012 | Klinger | |
| 2012/0226585 A1 | 9/2012 | Kogan | |
| 2012/0296697 A1 | 11/2012 | Kumar | |
| 2013/0046610 A1 | 2/2013 | Abraham | |
| 2013/0075464 A1 | 3/2013 | Van Horn | |
| 2013/0124360 A1 | 5/2013 | Mitrovic | |
| 2015/0027953 A1 | 1/2015 | Mann | |
| 2015/0032507 A1 | 1/2015 | Narasimhan | |
| 2015/0127439 A1 | 5/2015 | Campos De Figueiredo Faceira | |
| 2016/0342911 A1 | 11/2016 | Kannan | |
| 2017/0018013 A1 | 1/2017 | Faust | |
| 2017/0061463 A1 | 3/2017 | Ettl | |
| 2017/0286986 A1 | 10/2017 | Dey | |
| 2018/0315069 A1* | 11/2018 | Kamireddy | G06Q 30/0603 |
| 2021/0201359 A1* | 7/2021 | Sekar | G06Q 30/0269 |

OTHER PUBLICATIONS

Implementing Analytics for a Rating Engine.

"Big data analytics in E-commerce: a systematic review and agenda for future research" Shahriar Akter and Smuel Fosso Wamba, Electron Markets (2016) 26:173-194.

Mar. 8, 2018 USPTO Office Action (U.S. Appl. No. 15/808,948).

Oct. 18, 2018 USPTO Office Action (U.S. Appl. No. 15/808,948).

Kiran Gajanan Jakvar, Siddharth Hasmukh Vora, Amit Someshwarrao Rodge, Joy Bose, Hitesh Sharma ; "Best Offer Recommendation Service;" Intl. Conference on Advances in Computing, Communications and Informatics (ICACCI), (Year: 2016).

* cited by examiner

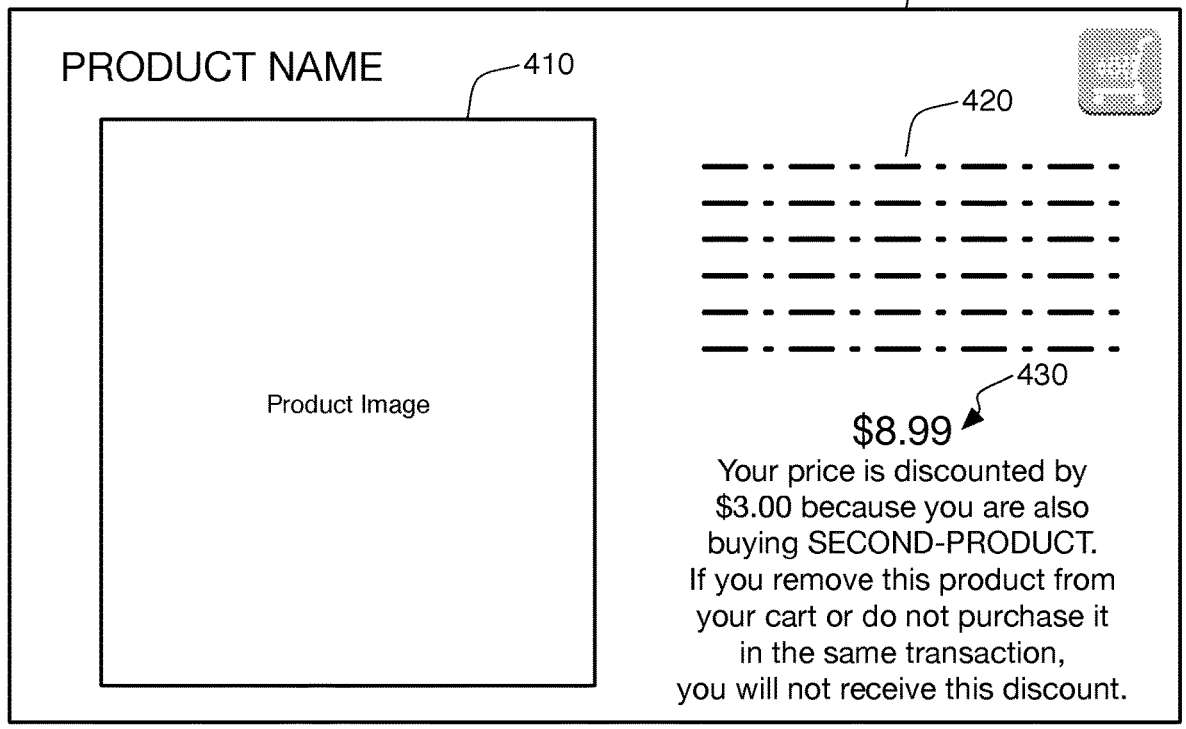
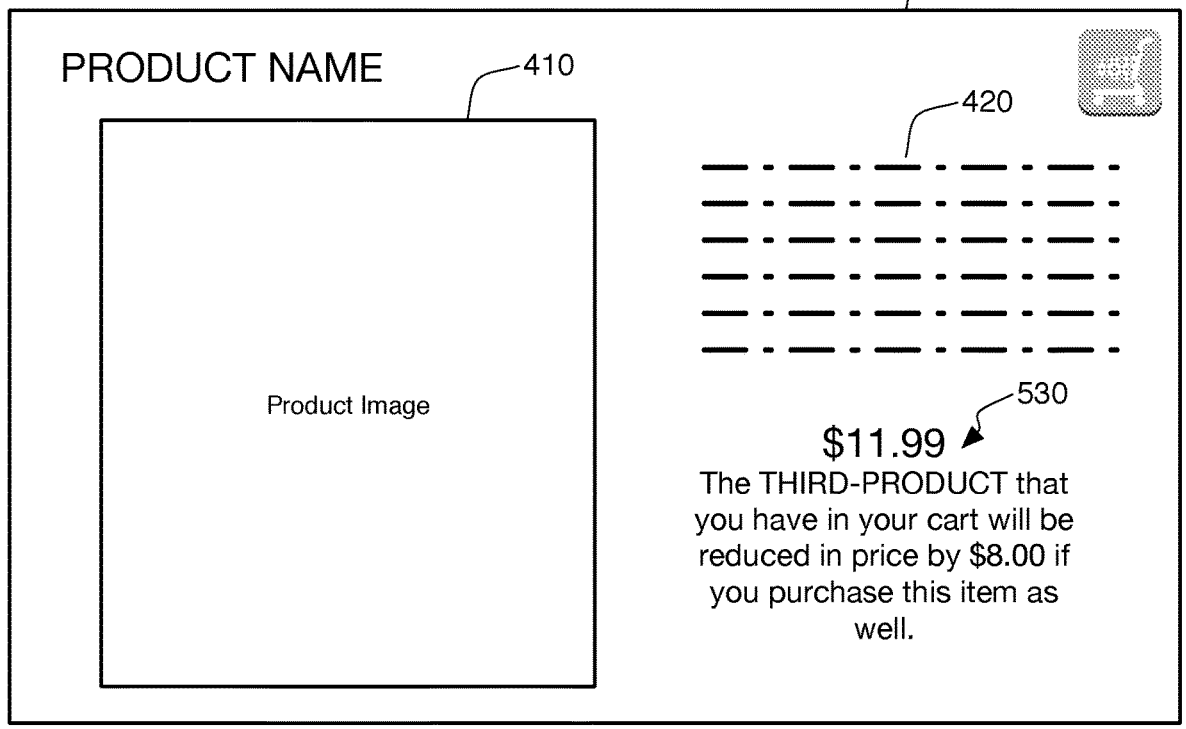

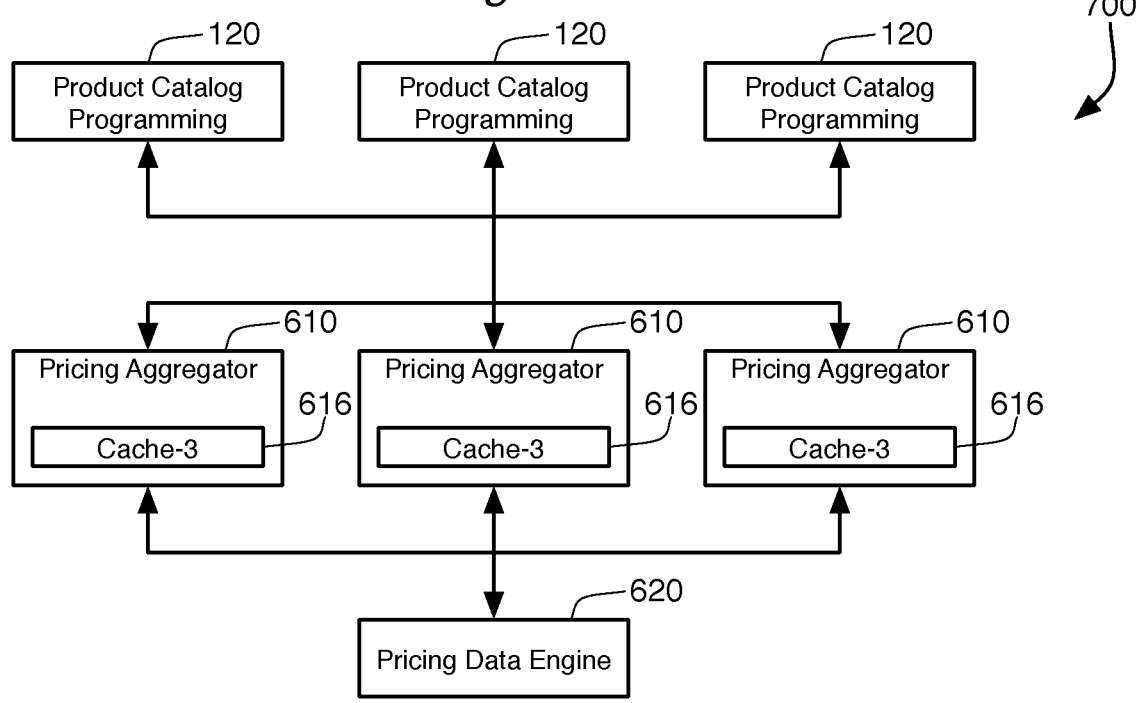
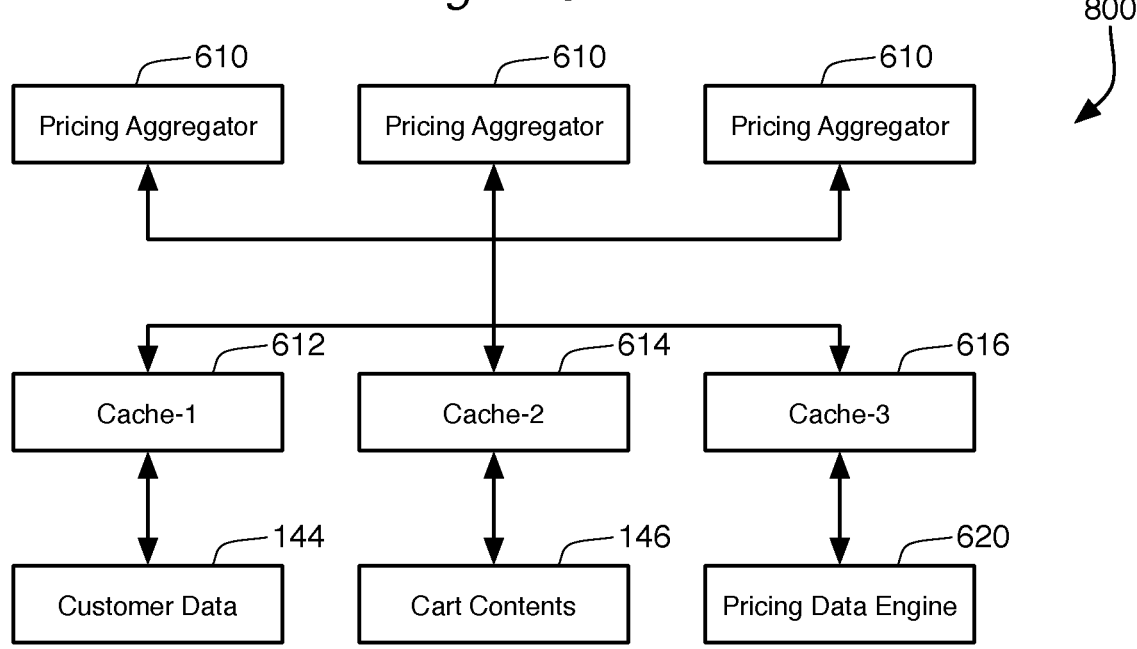

SYSTEM AND METHOD FOR CACHING OF DATA IN A COMPUTER SYSTEM

RELATED APPLICATIONS

The present application is a continuation of U.S. Ser. No. 15/808,948, filed on Nov. 10, 2017 (now U.S. Pat. No. 10,504,131), which in turn claimed the benefit of U.S. Provisional Application No. 62/516,332, filed on Jun. 6, 2017. Both of these applications are hereby incorporated by reference in their entireties.

FIELD OF THE INVENTION

The invention relates to caching techniques for providing the fast response times required for high-capacity, computer data throughput. In particular, the invention relates to the early fetching and caching of data details in order to provide responsive analysis in an e-commerce environment.

SUMMARY

When a user is browsing an e-commerce website for a product, the price for that product is dynamically determined and presented to the user (before the item is added to the shopping cart). A pricing engine provides this capacity by calculating the price for a product based on promotions ("offers") defined in an offer repository. Offers are examined and determined to be relevant to a currently-viewed product based on information acquired about the user or based on products currently in the user's shopping cart. Relevant offers are then used to alter the price presented to the customer on the website for that product.

Data relevant to these calculations are maintained in separate caches to improve processing speeds. Repeated data access requests are avoided by providing separate caching resources for different data requests. Each cache can provide a different time-to-live period based on the type of data maintained by the cache. External caches can be used to allow shared cache access to multiple computing instances that provide the dynamic pricing process.

Dynamic pricing is made possible during catalog browsing by evaluating offers in an offer repository to determine customer data that is relevant to potential promotions. Relevant customer data is retrieved before product browsing and maintained in a cache for extremely fast data retrieval during product browsing (effectively eliminating the need for standard database queries during product browsing). When products are added to the cart, promotions relevant to the cart contents are also retrieved and maintained in cache. When a product is viewed during catalog browsing, promotions relating to that product can be retrieved from the offer repository. All information needed to determine eligibility for the promotion is maintained in the cache for easy retrieval. Applicable promotions can then be used to calculate the dynamic price by the pricing engine, and the dynamic price can be displayed to the user. In one embodiment, a separate pricing data engine is used to calculate all possible prices for a product given the available promotions. This separate engine then generates a list of all possible prices for relevant products. When this data is stored in cache memory, great efficiencies are generated in the calculation of dynamic prices for a particular combination of a customer and items being purchased.

The promotions may be of two types. The first type of promotion is considered a personalized dynamic price. This type of promotion provides discounts based on information known about the user, such as the user's prior shopping history or their customer profile. For example, discounts may be provided to only a subset of users based on a characterization of that user by the e-commerce site (such as discounts that are provided only to users that have been identified as a "student" or a "parent"). The personalized pricing engine obtains information about the user, caches this information, identifies a product being viewed, determines if cached information qualifies the user for a promotion on the viewed product and, if so, dynamically adjusts the price displayed to the user.

The second type of promotion is price bundling, and provides discounts based on items found in the cart of the user. If the user has placed a particular item in their cart, related products may be discounted as a result. The pricing engine identifies these types of offers, verifies that the user has the appropriate "triggering" item or items in their cart based on previously cached data, and then determines the appropriate price for display to the user when browsing that item. The system can also determine if the discounted item is in the cart, and provide notification to a user when viewing the triggering item that the item already in the cart will be discounted if they purchase the triggering item.

BRIEF DESCRIPTION OF THE DRAWINGS

FIG. 4 is a screen shot showing product bundling reducing the price of an item being viewed.

FIG. 5 is a screen shot showing product bundling reducing the price of an item in the user's cart.

FIG. 7 is a schematic view of a third embodiment system in which multiple instances of pricing aggregators communicate with a single pricing data engine, with each instance having a separate cache.

FIG. 8 is a schematic view of a fourth embodiment in which cache memories are shared between multiple instances of pricing aggregators.

DETAILED DESCRIPTION

Overview

Figure 1:
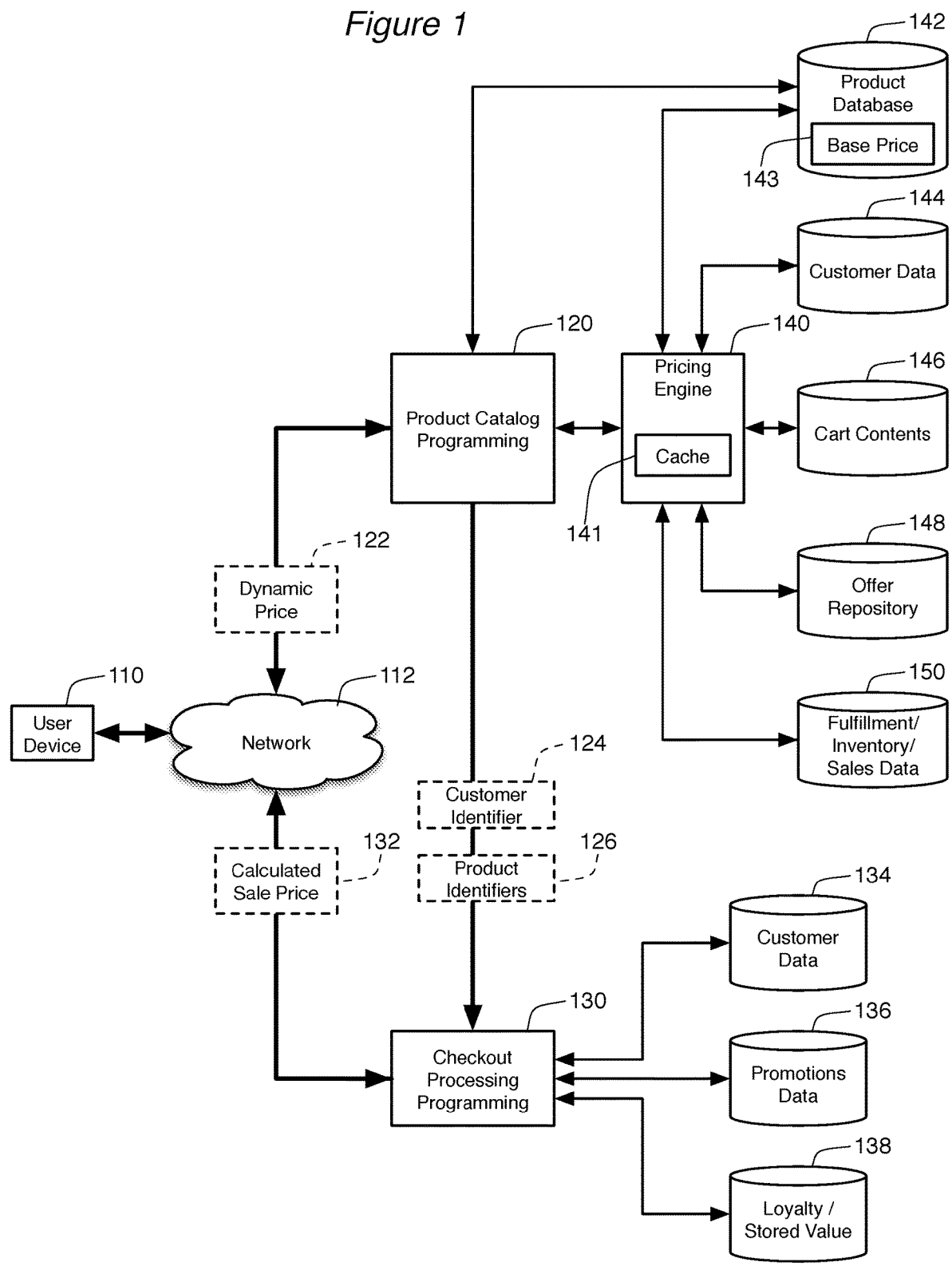
FIG. 1 is a schematic view of a system implementing one embodiment of the present invention.

FIG. 1 shows one embodiment of a system 100 for operating an e-commerce website that is accessible by a user device 110. In system 100, the user device 110 may be a computer operating a web browser, or a tablet or smart phone operating either a browser or an e-commerce app. The user device 110 communicates with one or more servers that operate the e-commerce operations of a retailer. In FIG. 1, the servers operate product catalog programming 120 as well as checkout processing programming 130. These two different programming elements 120, 130 might operate on a single server. Alternatively, a group of servers may jointly provide both catalog programming 120 and check out processing programming 130 for the e-commerce site. In a further embodiment, a first server (or group of servers) operates the product catalog programming 120, while a second server (or group of servers) operates the checkout processing programming 130.

The product catalog programming 120 provides the catalog of available products to the user device 110 for browsing. In this context, browsing means reviewing one or more products available for purchase through the e-commerce operation before the item is selected for purchase or placed into a shopping cart basket for later purchase. The products may be displayed in separate web pages (or separate screens on a dedicated shopping app), or multiple products may be displayed on the same page or screen. In each case, the catalog programming 120 will provide images and/or descriptions for the products being browsed, will provide pricing information for that product, and will provide an ability for the customer to purchase the product by placing the product into a virtual "shopping cart." In the embodiment of FIG. 1, the product catalog programming can provide a dynamic price 122 to the user device during this display of the product catalog.

The product catalog programming 120 obtains product data, including product descriptions and images, from a product database 142. The product database 142 also contains the base pricing information 143 for the products. The catalog programming 120 uses its internal programming to format and present the product information and price in a pleasing manner to the user device 110. In the prior art, the product catalog programming 120 would simply provide the static, base pricing information 143 to the user during product presentation of the catalog. The base pricing 143 in the database 142 can be updated from time to time to reflect product price changes, sales events, and other permanent and temporary price changes to the product. But the resulting price 143 that was displayed in the prior art is considered "static" because it does not change based on the identity or shopping behavior of the user. In contrast, the embodiment shown in FIG. 1 presents a dynamic price 122 during the review of the product catalog because of the presence of the pricing engine 140, which is described in more detail below.

When a user has decided to purchase one or more products, the identifiers 126 for the selected products are shared with the checkout processing programming 130 (such as by indicating that these identifiers 126 are in the customer's virtual shopping cart). This programming 130 can also use a customer identifier 124 for the customer to provide a personalized checkout experience. Using the customer identifier 124, the checkout programming 130 can access information about the customer from a customer database 134. Accessing customer data 134 allows the checkout programming 130 to simplify the checkout process. Additionally, the checkout programming 130 may access a promotions database 136 to determine whether the items in the shopping cart are covered by any promotions, and a loyalty/stored value database 138 to determine whether the customer has access to any rewards in a loyalty program or other types of stored value that can be applied to the purchase transaction.

In accessing these data items 134, 136, 138, the checkout processing programming 130 gains the ability to alter the base pricing 143 for a product. In other words, the checkout processing programming 130 can create a calculated sale price 132 on one or more items and present that to the user. This calculated sale price 132 is considered different than the dynamic price 122, as the calculated sales price is determined during the checkout process while the dynamic price 122 is determined while simply browsing the product catalog. The processing power used by the checkout processing programming 130 to query the appropriate databases 134, 136, 138 and to calculate an adjusted sale price 132 for a product is significant. The time required for this processing is acceptable during checkout processing 130 because there are significantly fewer transactions handled by this processing 130 when compared with the product catalog processing 120. For example, the product catalog programming 120 in some large e-commerce sites handle more than 10,000 transactions per second. In contrast, the checkout processing programming 120 on the same site might handle fewer than 100 transactions per second. Therefore, the product catalog programming 120 of the prior art, which fails to use the pricing engine 140 shown in FIG. 1, is not able to generate and present to the user device 110 anything other than the static base price 143 for a product.

Pricing Engine 140 and Methods 200, 300

In practice, the pricing engine 140 is a computing device having a processor, random access memory, a high-speed data cache 141, and data communications to the product catalog programming 120 and various data sources 142-150. The product catalog programming 120 is similarly a computing device having a processor, random access memory, and data communications ability. This element 120 is described as the product catalog "programming" because the element provides the capability of providing catalog pages to end users through its programming. In effect, both elements are instances of computing devices performing specialized programming that communicate with each other. These computing devices may be operating on the same physical device, perhaps using multiple processors to perform different processes simultaneously. In other embodiments, these elements 120, 140 operate on separate physical machinery. As is explained in more detail below, the computing devices rely on caching memories to improve the efficiency of a process that was not capable of operation at high volumes prior to the introduction of these efficiencies.

The pricing engine 140 provides a dynamic price 122 to the product catalog programming 120. This allows the programming 120 to present a dynamic price 122 to the user device during the display of the product catalog. The pricing engine 140 may take the form of a specially programmed computer that presents the dynamic price to the server or servers operating the product catalog programming 120, or may take the form of a subroutine or other process running on the same server(s) as the product catalog programming 120. Alternatively, the pricing engine 140 can be considered merely a constituent part of the product catalog programming 120.

Regardless of its physical implementation, the pricing engine 140 has access to a data cache 141 to maintain local data. Data can be retrieved from external business databases and stored in the data cache 141 for fast analysis and manipulation by the pricing engine 140. By definition, the cache 141 is separate from the external databases and allows for faster data access than these external databases.

In the preferred embodiment, the pricing engine adjusts the base price 143 into the dynamic price 122 appropriate for the current user session, using two slightly different methods. These two methods are the personalized dynamic price method 200 shown in FIG. 2, and the product bundling dynamic price method 300 shown in FIG. 3. While these are shown in the figures as two separate methods 200, 300, at least one embodiment implements both methods simultaneous to create a single dynamic price 122. These methods are described immediately below, and are described in the context of system 100 shown in FIG. 1.

Figure 2:
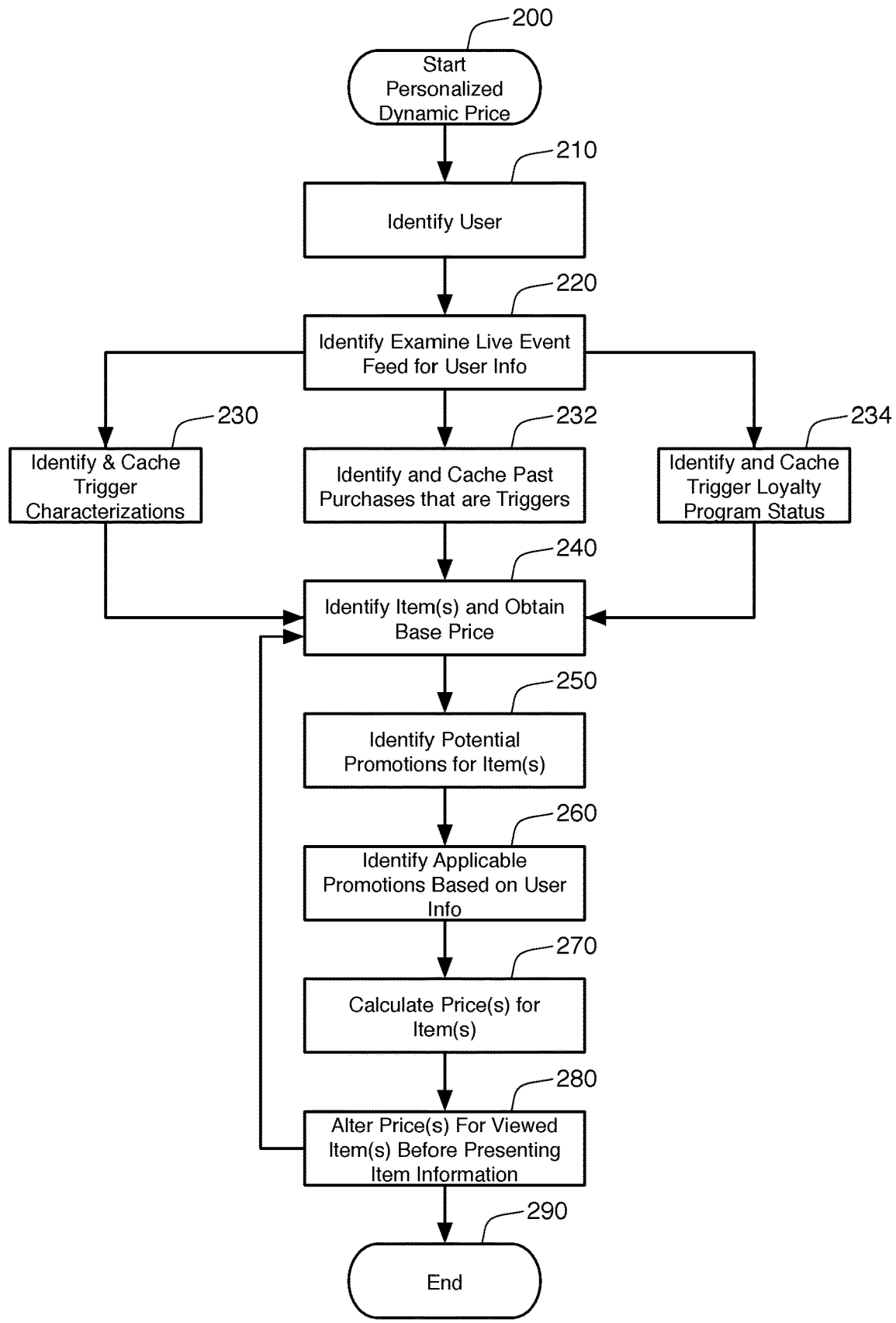
FIG. 2 is a flow chart showing a process of personalized dynamic pricing using improved caching.

The personalized dynamic pricing method 200 shown in FIG. 2 is designed to create a dynamic price 122 based on the identity of the user using the user device 110. The method 200 starts with the step 210 of identifying the user. The user can be identified by any means known in the prior art. For instance, a user may log into the e-commerce system 100 and begin a user "session" with the system 100. Each communication within the session will include an identifier (such as a session ID), which allows the system 100 to know the user associated with all communications to and from the user device 110. Even without requiring user login, a cookie or other data element associated with a single user can be stored on the user device 110 and communicated to the system 100 to identify the user. Alternatively, the user device 110 could utilize an app specialized for interaction with the e-commerce system 100, and the app could automatically identify the user.

Once the user is identified, the pricing engine 140 will locate any data that is associated with the identified user that may impact the dynamic price 122 for a product. This is accomplished by examining a "live event feed" for the user in step 220. The type of data that may impact this price 122 can vary widely depending on the desires of the entity operating the e-commerce system 100. In one embodiment, users are identified by segments or categories, and discounts are directed to only one or more segments of a retailer's customers. For example, the e-commerce site might be selling school supplies, and a discount may be given to all college-aged users on certain school supplies. Such a discount might be more specific, and be limited only to users known to be attending colleges, or parents of children attending college. In these cases, the pricing engine 140 would need to access a customer database 144, which may be the same as, or similar to, the customer database 134 accessed by the checkout processing programming 130. The customer database 144 may contain segmentations/characterizations of customers that have been previously established through database analysis or prior user confirmation. These characterizations may be, for example, "college student," "parent," "professional," "home-schooling parent," "athlete," "avid reader," "video game player," "trendsetter," or "sale-shopper." Of course, these characterizations are only relevant to the pricing engine 140 if the system 100 has established special pricing for individuals based on those characterizations. In the method shown in FIG. 2, identifying these characteristics takes place in step 230.

Alternatively, the system 100 may establish special pricing for individuals based on their prior purchases. For instance, a person that has purchased a garden tractor may be eligible for discounts on tractor accessories for the next six months, or an individual that purchased a portable computer may be eligible for special pricing on printers. To handle these discounts, the method 200 will examine (at step 232) the customer database 144 (or some other similar database that contains purchase history data) and determine the relevant past purchases for the current customer.

Alternatively, or in addition, the method 200 will examine the status of the current user in the e-commerce system's loyalty program in step 234. The loyalty program may assign program levels (such as silver, gold, or platinum status) to customers, and may offer rewards, discounts, or special pricing for loyal customers based on past activities. The benefits earned in the loyalty program may be stored in the customer database 144 (or in a similar database), and can be accessed in this step 234 to present the user with a dynamic price 122 that reflects those benefits.

Note that not all characterizations for a customer (identified in step 230) will impact the pricing 122 for products maintained by the e-commerce system 100. Similarly, not all past purchases will be relevant for discounts, and not all loyalty benefits will impact a dynamic price 122 to be displayed. The pricing engine 140 must know which data is relevant given the promotions and discounts currently available through the e-commerce system 100. In one embodiment, all currently available promotions are stored in an offer repository 148. The offer repository 148 is a database (or a portion of a database) that contains data about discounts and promotions that impact the pricing of a product available through the system 100. Each offer will contain rules defining the amount of the discount or a technique to calculate the change in price (such as "buy one, get the next at 50% off"). The offer will specify which products are to be discounted, and the criteria that must be met before the offer is applicable. For example, the offer may only apply to customers that have been identified as college students. Alternatively, the offer may only be available if a user has previously purchased a Sony television, or is a "gold status" member or better in the loyalty program. These criteria are often referred to as "prerequisites" or "triggers" for the offers, as the offers are not available until the criteria are met. If the pricing engine 140 is aware of all the triggers in the offer repository 148, the pricing engine can develop a list of the data that are relevant to trigger these offers. Information about a customer that does not trigger an offer in the offer repository 148 is not relevant to the pricing engine 140. Thus, in one embodiment, steps 230, 232, and 234 identify only relevant characterizations, past purchases, and loyalty program information that constitute a trigger for an active offer in the repository. The offers in the repository 148 change over time, so the list of applicable triggers will also change over time.

Because of the time required to create the dynamic price 122 during the user's catalog browsing session (before the checkout process), the pricing engine 140 must perform its processing as quickly as possible. In the preferred embodiment, the pricing engine increases its performance by carefully caching the results of steps 230, 232, 234 into data cache 141. This allows the pricing engine 140 to reuse the results of its data queries and analysis without re-querying the external databases 144 every time the customer views new products in the product database 142.

At step 240, the process identifies the item that is currently being viewed by the user device 110. The pricing engine 140 obtains the base price information 143 and other relevant information from the product database 142. The pricing engine 140 will then identify potential promotions by requesting a list of offers from the offer repository 148 that apply to the selected products (step 250). In the preferred embodiment, product information and promotion data are also cached by the pricing engine 140 so that physical requests for data from the product database 142 and offer repository 148 can be minimized.

Next, the pricing engine 140 will apply the cached data from steps 230, 232, and 234 to identify which of these potential promotions are actually applicable at step 260. For example, step 250 may identify a potential promotion for a selected product that requires that the customer be at the "platinum" level in the loyalty program. However, step 234 cached that the customer is only at the "gold" level, so step 260 will not identify this promotion as applicable.

When applicable promotions are identified in step 260, step 270 will calculate the dynamic price 122 for those products based on those applicable promotions. If multiple promotions apply to an individual product, then step 270 will determine which promotion(s) should be applied. For instance, business rules embodied in step 270 may indicate that the promotions should be applied to create the lowest dynamic price 122, or may indicate that certain promotions should always be applied instead of other promotions. The business rules implemented in step 270 can be varied as desired. The calculated dynamic price from step 270 is then used to alter the price presented by the product catalog programming 120 to the user device 110 in step 280. In this way, the user of user device 110 receives the dynamic price of the product during normal browsing of the product catalog, and does not need to wait until checkout to see all the relevant discounts.

In the preferred embodiment, the dynamic price presented in step 280 is the only price presented and is presented "inline" along with the rest of the product description. This means, for example, that the dynamic price is not presented as a "pop-up" in a separate window or overlay over the product display. Furthermore, the user is not required to click on a link, or to place an item in a cart, before the dynamic price is displayed in step 280. After step 280 is complete, the user may elect to view additional or different items. In this case, the method 200 returns to step 240, and the previously cached data from steps 230, 232, and 234, and previously cached product and promotional information from steps 240 and 250 are reused to create the dynamic price 122 for the new items. Alternatively, the method can end at step 290 after the dynamic price is displayed.

Figure 3:
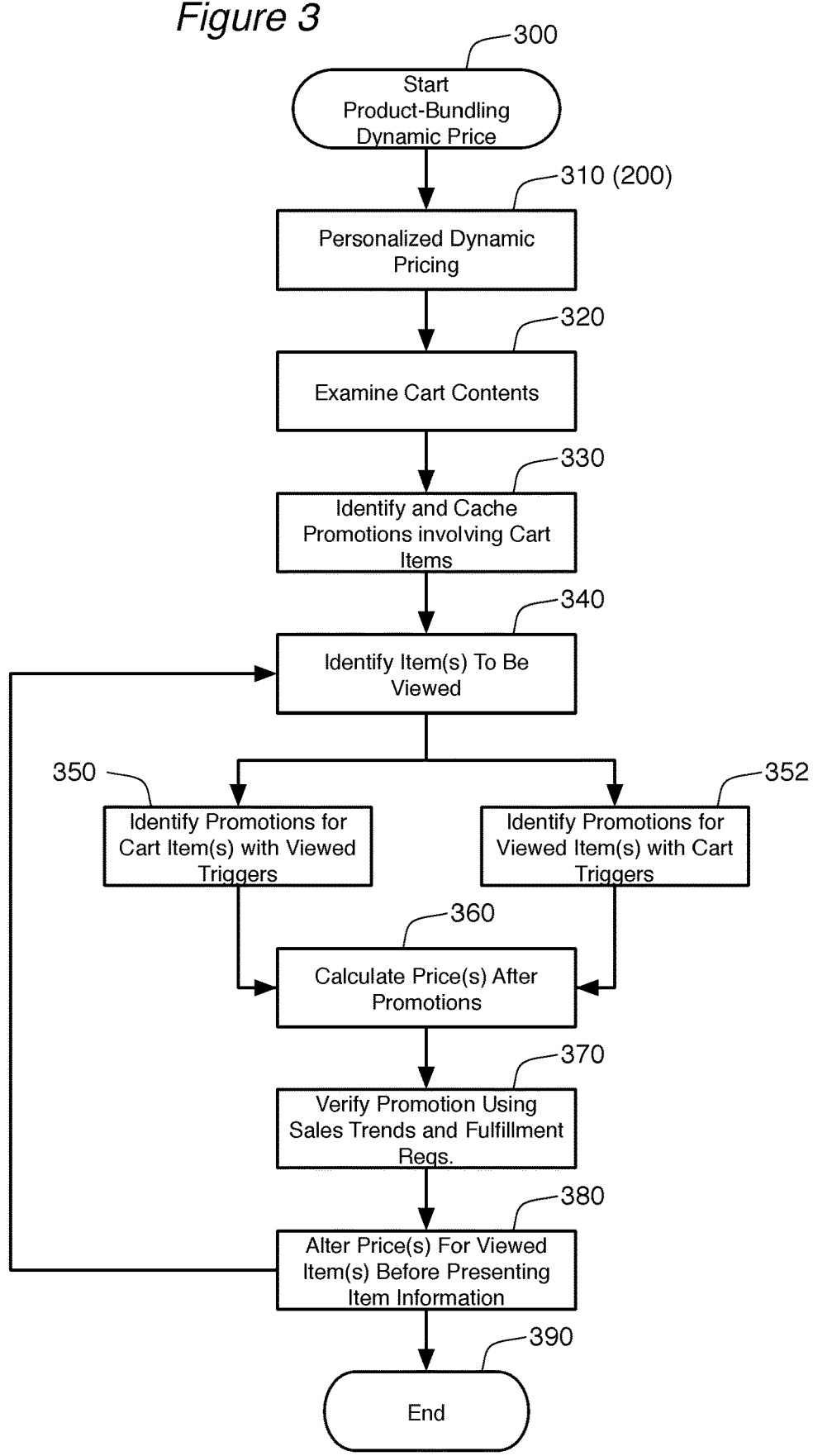
FIG. 3 is a flow chart showing a process of product bundling dynamic pricing using improved caching.

FIG. 3 discloses a method 300 for product-bundling dynamic pricing. The product-bundling dynamic price method 300 is designed to show dynamic pricing that relates to product "bundling" promotions. In other words, certain promotions may require that two items be purchased together. In this case, if a user has one of the two items in their shopping cart, this method 300 will identify the situation and alter the dynamic price 122 for one or both items. The first step 310 in this method is optional, and it is to initiate the personalized dynamic pricing method 200. In other words, the two methods 200, 300 should not be considered mutually exclusive alternatives for calculating a dynamic price 122, but as complementary processes that can operate together.

In step 320, the process 300 identifies those products that the user currently has in her shopping cart. In FIG. 1, the cart contents are figuratively shown as a separate database 146 accessed by the pricing engine 140. In an actual implementation, it is unlikely that the contents of user shopping carts will constitute a separate database. The presence of an item in the cart indicates an intention (or at least a desire) for the user to purchase that item. In some environments, the contents of a user's cart can be saved in cache 141. At step 330, the method then identifies and caches any promotions that involve products currently in the shopping cart. Note that the items in the cart can be the discounted item in the promotion, or can be the "triggering" item that triggers a promotion on another item, or both. In either case, step 330 will identify and cache that promotion. In some embodiments, the promotions identified in step 330 will require an evaluation of customer data 144 in a manner similar to that performed in method 200. For instance, the promotion may indicate that purchases of a portable computer may qualify for a discount on a printer, but only if the customer has attained a "platinum" level in the loyalty program. If this customer information was previously cached in step 234, it would be a simple matter to examine this cached data when determining the promotions for step 330.

At step 340, the user has indicated a desire to view information about particular products. Once those items are identified, step 350 will determine whether there are any cached promotions for which the viewed items constitute a trigger for a discount on the item currently in the cart. At the same time, step 352 will determine whether there are any cached promotions that discount the viewed items based on a trigger item found in the user's cart. If either step 350 or 352 identify one or more promotions, step 360 will calculate a new dynamic price based on these promotions.

In some embodiments, the offers in the offer repository 148 are contingent on fulfillment information, inventory data, and/or sales data related to those items being discounted. For example, a promotion may apply only if the two items being bundled are being shipped from the same distribution center. Alternatively, the promotion may apply only if the item being promoted has sold poorly during the last month. Poor sales may be determined, for example, relative to related products, or may be determined by examining the sales of an overall product category. In yet another example, a promotion may be discontinued if the inventory for the discounted product is reduced below a certain threshold value. Information about fulfillment, inventory, and/or sales data can be stored in one or more separate databases 150 accessed by the pricing engine 140. Step 370 is responsible for determining that any criteria/triggers related to this type of data are met before the dynamic price 122 is shown to the user. Step 370 is shown as a separate step in FIG. 3, but other embodiments would examine these types of triggers along with other triggers in steps 330. In this way, the cached promotions from 330 would reflect the application of any fulfillment, inventory, and/or sales data triggers. Note that these types of fulfillment/inventory/sales triggers can also be applied to the promotions applied in the dynamic pricing method 200.

At step 380, the dynamic price for the items involved can be updated and presented to the customer. As was the case in step 280, these prices are integrated into the same screen that presents the product information when the customer is browsing the catalog of products presented by the e-commerce system 100. However, the presentation of a bundling dynamic price is different in that the price provided requires the purchase of another item. This difference is shown in the presentation screens conceptually presented in FIGS. 4 and 5.

FIG. 4 shows a presentation screen 400 created by method 300 when step 352 identified a promotion that alters the dynamic price of a viewed item because a trigger item (the "second-product") for the promotion is found in the user's shopping cart. As explained above, the dynamic price 122 is presented in the product information screen. In FIG. 4, this screen 400 contains a product image 410 and a product description 420. The dynamic price 430 is presented along with an explanation of how and why the relevant promotion is altering the base price for this product. In this case, the dynamic price 430 represents a $3.00 discount because a second-product is already in the user's cart. The second-product, in this case, is the triggering item for a promotion on the product being displayed. The explanation explains that this discount will apply only if the second-product is also purchased at the same time.

Similarly, FIG. 5 shows a presentation screen 500 for the same product. In this case, step 350 identified a promotion where the viewed product is a trigger product and the product in the shopping cart (the "third-product") is the product being discounted. The price displayed 530 on this screen 500 is not directly discounted, but the explanation indicates that a significant discount will be provided to the customer for the third-product already in the shopping cart if the user were to also purchase the displayed product. Note that this discount is only available if the user purchases this trigger item. This means that if the user were viewing a different item that was not a trigger item, no discount would be presented relating to the third-product in the shopping cart.

Alternative Embodiment 600

Figure 6:
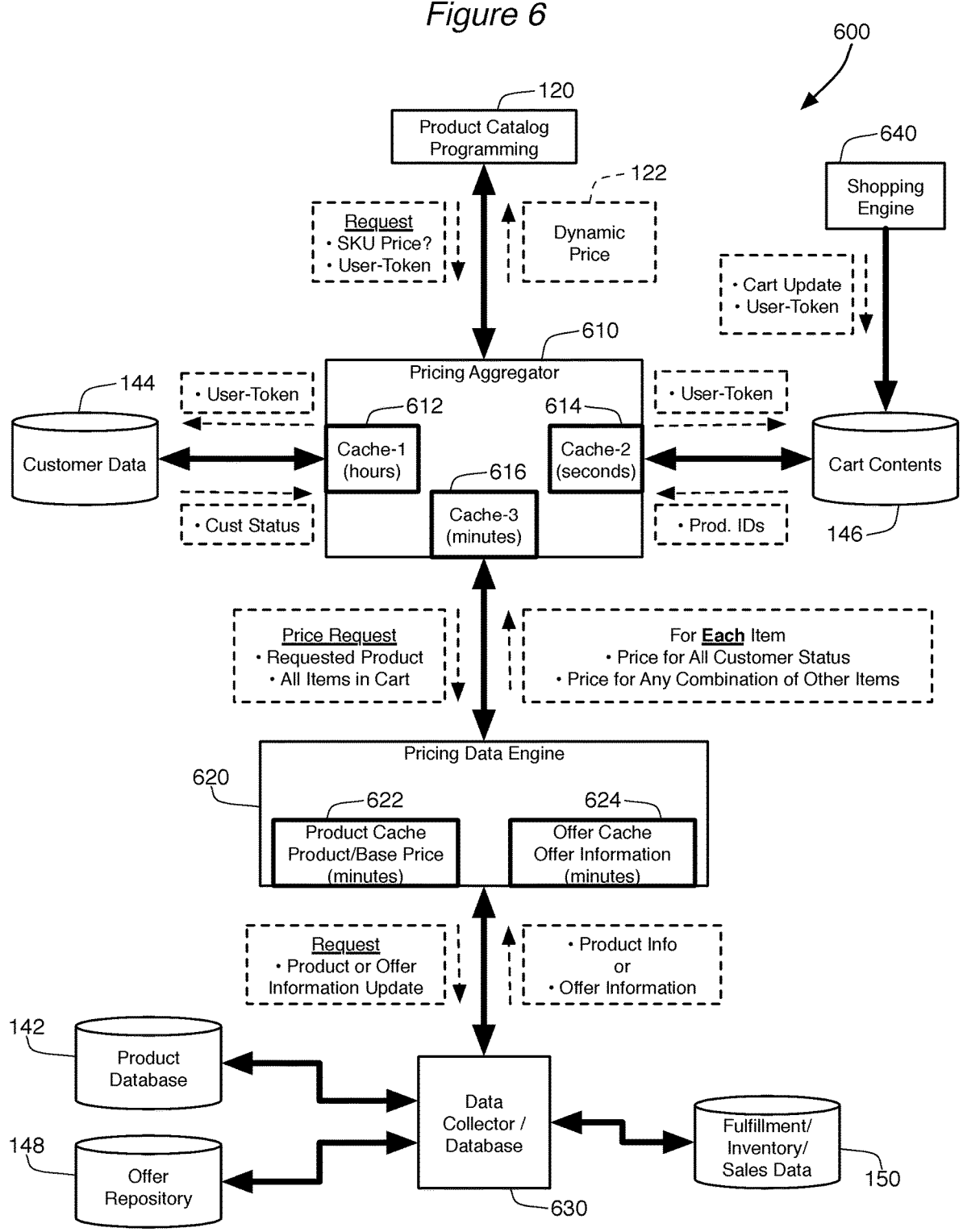
FIG. 6 is a schematic view of a second embodiment system operating a plurality of separate caches to implement the present invention.

FIG. 6 shows an alternative embodiment 600 where the role of the pricing engine 140 is divided into a pricing aggregator 610 and a pricing data engine 620. The pricing aggregator 610 is responsible for receiving the request for a dynamic price 122 from the product catalog programming 120. This request identifies both the SKU number (or other product code) for the product that requires pricing information as well as a user-token that uniquely identifies the user that is requesting the product price. The contents of this request are shown in FIG. 6 within the dashed line box next to the dashed downward arrow between the product catalog programming 120 and the pricing aggregator 610. FIG. 6 uses these dashed arrows and boxes to identify data that is moving between the schematic elements shown in the Figure. For example, the dashed upward arrow between the pricing aggregator 610 and the product catalog programming 120 indicates that the pricing aggregator 610 is responsible for providing the dynamic price 122 to the product catalog programming 120. When the product catalog programming 120 receives this dynamic price 122, it creates a web page (or other user interface) incorporating this dynamic price 122 for the user device 110 in the same manner as described above in connection with FIG. 1.

The pricing aggregator 610 is shown in FIG. 6 with three high-speed memory caches, namely cache-1 612, cache-2 614, and cache-3 616. These three caches 612, 614, 616 can be implemented on three separate, physical memory devices, or they can be implemented on a single memory device and just be maintained separately on that device.

The pricing aggregator 610 receives information about a customer status and segmentation from the customer database 144. To obtain this information, the pricing aggregator 610 submits the user-token (or data derived from the user-token) received from the product catalog programming 120 to the customer database 144. The pricing aggregator 610 receives the customer status and segmentation information (such as the "gold status" of the customer in the retailer's rewards program and the "college student" segmentation information) and stores this in cache-1 612. Since the type of information stored in cache-1 is unlikely to change very frequently (the status or segmentation information for a customer will change very rarely), the information in cache-1 612 can be stored for a long time without refresh. In one embodiment, the time-to-live ("TTL") for this cache-1 is measured in hours (one or more hours), as is shown in FIG. 6. This means that once the pricing aggregator 610 receives information about this customer from database 144, it will be able to read this information out of cache-1 for the TTL period without submitting another request to the customer data source 144. This caching greatly increases the efficiency of the pricing aggregator 610. It is generally preferred that the TTL for cache-1 is greater than one hour, so as to limit as many unnecessary calls to the customer data source 144 without significant risk of missing a change of customer status or segmentation.

The pricing aggregator 610 also receives information about the user's cart contents from data source 146. The cart contents database 146 tracks those items that a user has in her cart, and is updated from a separate shopping engine process 640 (not shown in FIG. 1) every time the user adds or removes an item from their shopping cart. The pricing aggregator 610 requests this information by submitting user identification data to the cart contents database 146, and the database 146 responds by providing all the product identifiers (such as the SKU numbers) for the products in that user's shopping cart. The pricing aggregator 610 saves the content of the user's cart in cache-2 614. This means that if the user requests the price of a second product immediately after requesting the price of a first product, the pricing aggregator 610 does not need to request the content of the user's cart from database 146, but can instead read this data from cache-2 614. In order to be useful, the time-to-live value from this cache-2 614 must be long enough to allow for multiple price requests, but it cannot be so long as to miss a user's transaction with the shopping engine 640. In one embodiment, the TTL for cache-2 614 is measured in seconds (one to sixty seconds). Although this time-to-live can vary between embodiments, it is generally preferred that the TTL for cache-2 614 be less than one minute so that changes to the cart content are not missed.

The pricing aggregator 610 receives a third type of information from the pricing data engine 620. The pricing data engine 620 is responsible for informing the pricing aggregator 610 of every possible price that is relevant for the determination of the dynamic price 122. In other words, the pricing data must indicate all possible prices for the SKU received from the product catalog 120, such as one price for "gold status" customers, another price for "elite status" customers, and a third price for "college student" segment customers. As explained above, the dynamic price 122 may also take into consideration the impact of the products currently found in the user's shopping cart. In order to provide this information, the pricing aggregator 610 must include both the item identified by the product catalog programming 120, and also all the items currently found in the customer's cart. In return, the pricing data engine 620 will inform the pricing aggregator of every possible price for all of the items (both the requested item and the items in the cart), for all possible customer statuses and segments, and for all combination of products among those included in the request.

For example, a user may have a camera (product ID 1001) and a case (product ID 1002) for that camera in her cart, and the product catalog programming may request the dynamic price for a related camera lens (product ID 1003). As explained above, the pricing aggregator 610 learns the content of the user's cart by accessing cache-2 614 or requesting that information from the cart contents database 146. The pricing aggregator 610 will include all three product identifiers (1001, 1002, and 1003) in the price request submitted to the pricing data engine 620. The pricing data engine 620 will return pricing information for each of these items reflecting all possible discounts for a user status or segment, and all possible discounts for bundled product discounts. In this simplified example, the data might be as follows:

| Product ID | Cust Class | Cust Segment | Purchased With | Price |
|---|---|---|---|---|
| 1001 | | | | 500 |
| 1001 | Elite | | | 480 |
| 1001 | | College Student | | 490 |
| 1001 | Elite | College Student | | 460 |
| 1002 | | | | 75 |
| 1002 | | | 1001 | 25 |
| 1002 | Elite | | 1001 | 0 |
| 1002 | | | 2015 | 25 |
| 1003 | | | | 200 |
| 1003 | | | 1001 and 1002 | 100 |

In this chart, the first column contains the product ID, and the last column indicates the price for that product. The intermediate columns contain the prerequisites that must be met for that price to apply to that product. If these intermediate columns are blank, then that row contains the base price 143 for that product. According to this information, the camera (product ID 1001) is normally priced at $500, but is discounted for elite members of the rewards program down to $480, and is discounted for known college students down to $490. Elite college students can purchase the camera for $460. The camera case (product ID 1002) is normally priced at $75, but can be purchased for $25 if purchased with the camera (product ID 1001). This same case is free if purchased by elite members along with the camera. The requested item (the item being viewed by the customer) is the camera lens (product ID 1003), and this information indicates that the price of the lens is $200, but the lens can be purchased for $100 if purchased along with items 1001 and 1002.

Note that pricing information returned by the pricing data engine 620 also indicates that the camera case (product ID 1002) can also be purchased for $25 if purchased with item ID 2015. This item is not found in the user's cart, and therefore was not identified in the price request from the pricing aggregator 610. Nonetheless, the pricing data engine 620 will include this information in the pricing data returned to the pricing aggregator 610 as it may be useful for the next pricing request received by the pricing aggregator 610. In other words, the pricing data engine 620 provides all possible prices for all the items listed in the price request. This means that the pricing data engine 620 has no responsibility for determining which of these prices is relevant in the current context; it needs only to provide all known possible prices for the items contained in the price request from the price aggregator 610. It is then up to the pricing aggregator 610 to determine which of these prices is relevant for the current user.

The pricing data received from the pricing data engine 620 is stored by the pricing aggregator 610 in cache-3 616. The time-to-live of the data in this cache-3 616 is longer than the TTL in cache-2 614 (as it is less likely to change), but is shorter than the TTL in cache-1 612 (as is it subject to more frequent changes than the customer status and segmentation). In the embodiment shown in FIG. 6, the TTL for cache-3 is measured in minutes (between one and sixty minutes). This means that product pricing information obtained from the pricing data engine 620 can be obtained from the cache-3 616 for the TTL period after it was received from the pricing data engine 620. In most circumstances, a relatively small percentage of the products within a retailer's product catalog make up a large percentage of the products being reviewed and purchased by a customer. During extremely busy times for an e-commerce retailers, a large percentage of its customers are focusing in on sale items. Pricing requests for these sale items could overwhelm the pricing data engine 620 if not for the presence of the cache-3 616. Thus, even though the cache-3 616 stores the pricing information for minutes, this is enough time to handle thousands of requests for pricing information.

The pricing aggregator 610 examines the pricing data received from the pricing data engine 620 and compares the pricing prerequisites in that pricing data with both the user information received from customer data 144 and the cart content information received from the cart contents data source 146. From this information, the pricing aggregator 610 can determine the best price for the product based on this customer's unique status and segmentation information. In addition, the pricing aggregator 610 can determine whether any of the items in the user's cart can be bundled with this product in order to reduce the price of the product. Finally, the pricing aggregator can determine whether any of the products already in the user's cart will have their prices reduced by the purchase of the currently reviewed product. This information is then presented back to the product catalog programming 120 in the form of the dynamic price 122.

The pricing data engine 620 acquires information about the available prices for the requested products from the product database 142, the offer repository 148, and the fulfillment/inventory/sale data source 150. In one embodiment, each of these separate data sources 142, 148, and 150 are capable of monitoring themselves and then push any detected data changes to an external processor. To handle the receipt of this push data, and to avoid overwhelming the capabilities of the pricing data engine 620, a data collector 630 is used. This data collector 630 receives these push notifications and then updates an intermediate database that stores the current status of each of these data items. Although FIG. 6 shows that the data collector and database within the same schematic element 630, the data collector and intermediate database could also be viewed as separate elements in the overall system 600.

The pricing data engine 620 requests information about products and offers from the data collector 630. Product information received from the data collector 630, including a product's base price, is cached by the pricing data engine 620 in its product cache 622. The time-to-live of this cache 622 in the embodiment shown in FIG. 6 is also measured in minutes. In one embodiment, the TTL for cache 622 is less than the cache-3 616, which means when the pricing data in the cache-3 616 goes stale, it will receive product data from the pricing data engine 620 that is no older than the TTL of cache 622. This helps to ensure that the data in cache-3 616 related to product data such as the base price of a product is never for too long of a period removed from the actual product database 142. Offer related information is also cached by the pricing data engine 620, this time in an offer cache 624 that has a TTL measured in minutes as well. The TTL for cache 624 can be longer than the TTL for cache 622 because offers are subject to less frequent changes and less urgent changes than those made to the product database 142. For example, the TTL for cache 624 may be 2-3 times longer than the TTL for cache 622. As described above, some offers may depend on current inventory levels, prior sales data concerning the product, or fulfillment information such as ship-from locations. This data 150 can be used by the pricing data engine 620 to determine relevant offers for various products, and can be temporarily stored in the offer cache 624.

Although it is not shown in FIG. 6, in some embodiments the pricing aggregator may also be responsible for determining fulfillment/shipping prices for products and groups of products. Some products may have special shipping costs or processes, or in other cases certain customers may be eligible for discounted shipping. One may also provide a shipping discount when all products within a promotional bundle are purchased together. This type of fulfillment processing can be handled by the pricing aggregator 610 in much the same way as the dynamic pricing is handled. In fact, fulfillment pricing can be incorporated into the dynamic price 122 that is returned to the product catalog programming. In particular, fulfillment offers for the relevant items can be requested from the pricing data engine and stored with the product pricing information in cache-3

616. Alternatively, a fulfillment engine (not shown in FIG. 6) can be provided that provides the necessary fulfillment data to the pricing aggregator 610. The pricing aggregator can request fulfillment data for all relevant products from the fulfillment engine, and then store data in a fourth cache (not shown).

FIG. 7 shows an alternative configuration 700 where multiple instances of the product catalog programming 120 interact with multiple instances of the pricing aggregator 610. These different instances may be on separate physical devices, or may be operating in parallel on a single computing device. The instances may even be operating on devices that are physically remote from one another. In the embodiment shown in FIG. 7, three instances of the product catalog programming 120 serve web pages (or other user interfaces) to end user devices 110. The elements 120 shown in FIG. 7 are computing devices operating the programming 120 independently. Each instance 120 needs to communicate with the pricing aggregator 610, and in FIG. 7 there are three instances of the pricing aggregator 610. In this embodiment, any of the product catalog programming instances 120 can communicate with any of the pricing aggregators 610. Each of the pricing aggregators 610, in turn, need to communicate with the pricing data engine 620. In the embodiment shown in FIG. 7, only a single pricing data engine 620 is provided, and all instances of the pricing aggregator 610 communicate with the same pricing data engine 620.

In this type of embodiment, it is especially important not to OVER-burden the pricing data engine 620, or else the entire system 700 can bog down due to the bottleneck of communicating with the pricing data engine 620. As a result, efficient use of cache-3 616 can reduce calls to the pricing data engine 620 and increase the efficiency of the overall system 700. As shown in FIG. 7, each pricing aggregator 610 in this embodiment has its own, separate cache-3 616 to cache data that it receives from the pricing data engine 620. While this improves the efficiency of the system 700, it fails to take advantage of all of the determinations and transmissions made by the pricing data engine 620. Data sent to one pricing aggregator 610 is not made available to any other pricing aggregator 610.

FIG. 8 shows a partial embodiment of another system 800 that overcomes this issue. FIG. 8 shows only the interaction of the pricing aggregator instances 610 with their primary data sources 144, 146, and 620. In this case, all three instances of the pricing aggregator 610 share the same customer data source 144, the same cart contents database 146, and the same pricing data engine 620. The product catalog programming 120 is not shown in FIG. 8 to simplify the Figure. To increase the efficiencies of the caching, the multiple instances of the pricing aggregators 610 share cache-1 612, cache-2 614, and cache-3 616. These caches 612, 614, 616 may be, for instance, level 2 cache that exists outside the processing cores that operate the pricing aggregators 610. Because this cache 612, 614, 616 in not inside any of the processors, each instance 610 can share the data found in these shared, external caches 612, 614, 616, even if that instance 610 was not responsible for the original data request that placed the data within those caches 612, 614, 616.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method comprising:
a) receiving a first product information request relating to a first customer, the first product information request comprising a first product identifier identifying a first product and a first user identifier identifying the first customer;
b) requesting customer information for the first user identifier from a customer data source;
c) receiving first customer information from the customer data source;
d) storing the first customer information in a customer data cache;
e) requesting pricing data for the first product identifier from a pricing data engine;
f) receiving first pricing data from the pricing data engine, the first pricing data comprising a plurality of prices for the first product identifier, with a first discounted price in the first pricing data being associated with a first trigger condition;
g) storing the first pricing data in a pricing data cache;
h) determining that the first customer information meets the first trigger condition; and
i) transmitting the first discount price in response to the first product information request; and
j) after step i), receiving an indication that the first customer has placed the product into an electronic shopping cart for purchase.

2. The method of claim 1, further comprising:
k) receiving a second product information request relating to a second customer comprising the first product identifier and a second user identifier;
l) requesting customer information for the second user identifier from the customer data source;
m) receiving second customer information from the customer data source and storing the second customer information in the customer data cache;
n) retrieving the first pricing data for the first product identifier from the pricing data cache;
o) transmitting a second price different than the discount price in response to the second product information request.

3. The method of claim 1, further comprising:
k) receiving a second product information request relating to the first customer comprising a second product identifier identifying a second product and the first user identifier;
l) retrieving first customer information for the first user identifier from the customer data cache;
m) requesting pricing data for the second product identifier from the pricing data engine;
n) receiving second pricing data from the pricing data engine, the second pricing data comprising a plurality of prices for the second product identifier, with a second discounted price in the second pricing data being associated with a second trigger condition and a base price not being associated with any trigger condition, and storing the second pricing data in the pricing data cache;
o) determining that the first customer information does not meet the second trigger condition; and
p) transmitting the base price in response to the second product information request.

4. The method of claim 1, further comprising:
k) requesting cart content data for the first user identifier from a cart contents data source;

l) receiving first user cart content from the cart contents data source, the first user cart content comprising a plurality of cart product identifiers identifying products in the first customer's electronic shopping cart;
m) storing the first use cart content in a cart content cache;
n) requesting pricing data for the plurality of cart product identifiers;
o) receiving cart product pricing data from the pricing data engine, the cart product pricing data comprising a plurality of prices for the products in the first customer's electronic shopping cart including a bundled price indicating a bundled discount for a particular product in the first customer's electronic shopping cart that is available when the particular product is purchased with the first product;

wherein the step of transmitting the first discount price further comprising indicating the bundled discount.

5. The method of claim 4, further comprising storing the cart product pricing data in the pricing data cache.

6. The method of claim 4, wherein the customer data cache, the pricing data cache, and the cart content cache exist on a single physical memory structure.

7. The method of claim 4, wherein the customer data cache, the pricing data cache, and the cart content cache comprising separate physical caches.

8. The method of claim 7, where the customer data cache, the pricing data cache, and the cart content cache are level 2 external caches.

9. The method of claim 8, wherein the customer data cache, the pricing data cache, and the cart content cache are all shared between multiple instances of computing devices all performing a similar function of determining a product price.

10. The method of claim 4, wherein the cart content cache is a level 2 external cache, and further wherein the cart content cache is shared between multiple instances of computing devices all performing a similar function of determining a product price.

11. The method of claim 4, wherein the time-to-live for the customer data cache is longer than the time-to-live for the pricing data cache, and wherein the time-to-live for the pricing data cache is longer than the time-to-live for the cart content cache.

12. The method of claim 11, wherein the time-to-live for the customer data cache is longer than one hour.

13. The method of claim 12, wherein the time-to-live for the cart content cache is less than one minute.

14. The method of claim 1, wherein the pricing data engine determines the first pricing data by a sub-method comprising:
   i) requesting product information relating to the first product from a product database, the product information comprising a base price;
   ii) requesting offer information from an offer repository, the offer information comprising a discount on the first product upon the occurrence of the first trigger condition;
   iii) determining the first discount price by applying the discount to the base price; and
   iv) constructing first pricing data including the base price with no trigger condition and the first discount price with the first trigger condition.

15. The method of claim 14, wherein the pricing data engine stores the product information in a product cache for later retrieval of the product information without requiring an additional request to the product database.

16. The method of claim 15, wherein the pricing data engine stores the offer information in an offer cache for later retrieval of the offer information without requiring an additional request to the offer repository.

17. The method of claim 1, further comprising the step of determining a fulfillment price for the first product and transmitting the fulfillment price along with the first discount price.

18. The method of claim 17, wherein the step of determining the fulfillment price comprising first requesting the fulfillment price for the first product identifier and then storing the fulfillment price in a fulfillment cache with a pre-set time-to-live.

* * * * *